United States Patent
Shinohara et al.

(10) Patent No.: US 11,970,628 B2
(45) Date of Patent: *Apr. 30, 2024

(54) FLUORORESIN COATING COMPOSITION FOR FORMING A TOPCOAT AND COATING FILM THEREFROM

(71) Applicants: THE CHEMOURS COMPANY FC, LLC, Wilmington, DE (US); CHEMOURS-MITSUI FLUOROPRODUCTS CO., LTD., Tokyo (JP)

(72) Inventors: Daisaku Shinohara, Shizuoka (JP); Kazuhiko Miyagishima, Shizuoka (JP)

(73) Assignees: THE CHEMOURS COMPANY FC, LLC, Wilmington, DE (US); CHEMOURS-MITSUI FLUOROPRODUCTS CO., LTD., Tokyo (JP)

( * ) Notice: Subject to any disclaimer, the term of this patent is extended or adjusted under 35 U.S.C. 154(b) by 84 days.

This patent is subject to a terminal disclaimer.

(21) Appl. No.: 16/320,434

(22) PCT Filed: Jul. 24, 2017

(86) PCT No.: PCT/US2017/043516
§ 371 (c)(1),
(2) Date: Jan. 24, 2019

(87) PCT Pub. No.: WO2018/022504
PCT Pub. Date: Feb. 1, 2018

(65) Prior Publication Data
US 2019/0264059 A1    Aug. 29, 2019

(30) Foreign Application Priority Data
Jul. 27, 2016 (JP) .................... 2016-146875

(51) Int. Cl.
| C09D 127/18 | (2006.01) |
| B05D 3/02 | (2006.01) |
| B05D 5/08 | (2006.01) |
| C08F 214/26 | (2006.01) |
| C09D 5/02 | (2006.01) |
| C09D 5/03 | (2006.01) |
| C09D 5/16 | (2006.01) |

(52) U.S. Cl.
CPC .......... *C09D 127/18* (2013.01); *B05D 3/0254* (2013.01); *B05D 5/083* (2013.01); *C09D 5/02* (2013.01); *C09D 5/03* (2013.01); *C09D 5/1668* (2013.01); *B05D 2506/15* (2013.01); *C08F 214/262* (2013.01)

(58) Field of Classification Search
CPC .......... C09D 127/18; C09D 5/02; C09D 5/03; C09D 5/1668; B05D 5/083; B05D 3/0254; B05D 2506/15; C08F 214/262
USPC ......................................................... 526/252
See application file for complete search history.

(56) References Cited

U.S. PATENT DOCUMENTS

| 3,037,953 A | 6/1962 | Marks et al. |
| 3,635,926 A | 1/1972 | Greshman et al. |
| 4,380,618 A | 4/1983 | Khan et al. |
| 5,665,800 A | 9/1997 | Lai et al. |
| 5,760,151 A | 6/1998 | Aten et al. |
| 5,919,878 A | 7/1999 | Brothers et al. |
| 10,294,362 B2* | 5/2019 | Ueda ............. C08L 71/00 |
| 2004/0138367 A1 | 7/2004 | Lahijani |
| 2005/0222313 A1* | 10/2005 | Tomihashi ........ C09D 127/18 524/544 |
| 2006/0148972 A1 | 7/2006 | Combes et al. |
| 2008/0114122 A1 | 5/2008 | Brothers et al. |
| 2013/0059101 A1* | 3/2013 | Aten ............... B32B 1/08 428/421 |
| 2015/0191561 A1* | 7/2015 | Kitagawa ........ C08F 214/262 526/247 |
| 2016/0185995 A1 | 6/2016 | Mugisawa |

FOREIGN PATENT DOCUMENTS

| JP | 52044576 A | 4/1977 |
| JP | 2004161921 A | 6/2004 |
| JP | 2008224835 A | 9/2008 |

OTHER PUBLICATIONS

PCT International Search Report and Written Opinion for PCT/US2017/043516, dated Oct. 25, 2017.
ASTM D1238, Standard Test Method for Melt Flow Rates of Thermoplastics by Extrusion Plastometer, 2013.

* cited by examiner

*Primary Examiner* — Michael M. Bernshteyn

(57) ABSTRACT

Provided is a fluororesin coating composition for forming a topcoat having improved non-tackiness and water and oil repellency. The fluororesin is crystalline tetrafluoroethylene and perfluoro(ethyl vinyl ether) copolymer having a perfluoro(ethyl vinyl ether) content of 8 to 20 mass % based on the total mass of the copolymer.

16 Claims, No Drawings

FLUORORESIN COATING COMPOSITION FOR FORMING A TOPCOAT AND COATING FILM THEREFROM

CROSS-REFERENCES TO RELATED APPLICATIONS

This application claims the benefit of Japanese Patent Application No. 2016-146875 filed Jul. 27, 2016, which is incorporated by reference herein in its entirety.

FIELD OF THE INVENTION

The present invention relates to a fluororesin coating composition for forming a topcoat coating film, and to the topcoat coating film formed therefrom having improved non-tackiness and water and oil repellency.

BACKGROUND TECHNOLOGY

Fluororesins have excellent heat resistance, chemical resistance, electrical properties, and mechanical properties, and also have a very low coefficient of friction, non-tackiness, and water and oil repellency. They are therefore are widely used as coatings in industrial fields such as chemical, mechanical, electrical, and the like. In particular, melt processable fluororesins exhibit fluidity at a temperature above the melting point, and therefore are generally used as fluororesin coating compositions because the occurrence of pinholes in an initial deposited coating therefrom can be suppressed when melt processable fluororesin is used as the coating film.

As a form of the fluororesin coating composition, liquid coating composition where fluororesin is dispersed in water or an organic solvent is widely used, but melt processable fluororesin powder coating composition where solid fluororesin is granulated and adjusted on the order of a micrometer (average particle size: 1 to 100 μm) is also used.

Utilizing the non-tackiness and water and oil repellency of a fluororesin, fluororesin coatings are used in a variety of fields such as coating of frying pans, rice cookers, and other cookware, fuser rollers and belts that fix toner in office automation equipment, and the like. In recent years, fluororesin coating use has spread to other fields such as inkjet nozzles, chemical plant facilities, and the like. Further improvements in the non-tackiness and water and oil repellency of fluororesin coatings is desired by these industries.

Copolymers of tetrafluoroethylene (TFE) and perfluoroalkyl vinyl ether (PAVE), known as "PFA" in this field, are known as materials for a fluororesin coating composition for a topcoat, and PFA copolymers where the PAVE is perfluoro(propyl vinyl ether) (PPVE) or perfluoro(ethyl vinyl ether) (PEVE) are generally known.

For example, patent document 1 describes PFA with a PEVE content of 20 to 80 mass %. The PFA described in patent document 1 can achieve excellent film forming properties even at low temperature processing, and therefore can be preferably used in a case where the resistance is not provided on a coating substrate or in a case where the melting point is low. The PFA of patent document 1 is amorphous and whether or not the PFA is amorphous is determined based on the content of PAVE incorporated in the copolymer. Amorphous PFA is also described in patent document 2, containing PEVE that exceeds approximately 20 mass %, and has been shown to form a coating film having durability.

Furthermore, patent document 3 describes PFA in which a sheet penetrating mark is less likely to occur when sheets of thick paper are passed through, such PFA being used as a release layer material of a fixing member for an image forming device, such PFA having a PAVE content of 2 mol % to 6 mol %. Furthermore, patent document 4 describes PFA that provides excellent durability and melt moldability, with a PAVE content of 1.0 to 50 mass %; and patent document 5 describes PFA used as a coating composition for undercoating, containing metal powder, and with a PEVE content of approximately 1 to 18 mass %; and patent document 6 describes PFA having a high flexural life with a PEVE content of at least 3 mass %.

However, of the aforementioned PFA, PFA that specifically can be actually used as coating composition includes only the amorphous PFA described in patent documents 1 and 2 and the PFA used as a coating composition for undercoating described in patent document 5. When a fluororesin is used as a coating composition because of the physical properties of non-tackiness, a coating film may be difficult to form on a substrate, and there is no mention in any of the aforementioned patent documents of a fluororesin coating composition for a topcoat that achieves excellent non-tackiness as well as water repellency and oil repellency.

PRIOR TECHNOLOGY DOCUMENTS

Patent Documents

Patent Document 1: Japanese Unexamined Patent Application 2015-182381 (equivalent is US 2016/0185995 A1)

Patent Document 2: Japanese Patent No. 3980649 (U.S. Pat. No. 5,919,878)

Patent Document 3: Japanese Unexamined Patent Application 2008-224835

Patent Document 4: Japanese Patent No. 5665800 (US 2015/0191561 A1)

Patent Document 5: Japanese Patent No. 5165184 (US 2004/0138367 A1)

Patent Document 6: Japanese Patent No. 3519411 (U.S. Pat. No. 5,760,151)

SUMMARY OF THE INVENTION

Problem to be Resolved by the Present Invention

An object of the present invention is to provide a fluororesin coating composition for a topcoat forming a surface with improved non-tackiness and water and oil repellency while not having inferior adhesion to a substrate, a coating film thereof, an article having the coating film, and a method of forming the coating film.

Means for Resolving the Problem

As a result of various studies, the present inventors discovered that the aforementioned object is achieved by selecting a crystalline tetrafluoroethylene (TFE) and perfluoro(ethyl vinyl ether) (PEVE) copolymer (TFE/PEVE copolymer) of a melt processable fluororesin as material for a fluororesin coating composition for a topcoat, and setting the PEVE content from 8 to 20 mass % based on the total mass of the copolymer, thereby achieving the present invention.

The present invention can be described as a fluororesin coating composition for forming a topcoat, containing a crystalline tetrafluoroethylene and perfluoro(ethyl vinyl ether) copolymer with a perfluoro(ethyl vinyl ether) content of 8 to 20 mass % based on the total mass of the copolymer. In one embodiment the coating composition is an aqueous coating composition or powder coating composition. In one embodiment the invention comprises a coating film formed on a substrate from the aforementioned coating composition. In one embodiment the substrate is first primer coated or its surface chemically treated. In one embodiment the coating film is heat treated at the melting point, or a higher temperature, of the crystalline tetrafluoroethylene and perfluoro (ethyl vinyl ether) copolymer. In one embodiment the coating film has an n-hexane contact angle of 27 degrees or more.

The present invention includes articles comprising the aforementioned coating film.

The present invention includes a method of forming the aforementioned coating film, comprising the steps of: coating the aforementioned coating composition on a substrate and then performing heat treatment on the coated substrate. In one embodiment the heat treatment is carried out at the melting point, or a higher temperature, of the crystalline tetrafluoroethylene and perfluoro(ethyl vinyl ether) copolymer of the coating composition.

Effect of the Invention

According to the present invention, provided is a coating film with improved non-tackiness and water and oil repellency over existing fluororesin coating compositions (in particular, conventional PFA coating compositions) and that is also not inferior to conventional PFA coating film in adhesion, durability, and wear resistance.

DESCRIPTION OF THE PREFERRED EMBODIMENTS

The fluororesin coating composition for forming a topcoat of the present invention contains a melt processable crystalline TFE/PEVE copolymer.

In the present TFE/PEVE copolymer, the PEVE content is 8 to 20 mass %, preferably 8 to 15 mass %, and more preferably 9 to 12 mass %. When the PEVE content is less than 8 mass %, sufficient non-tackiness and water and oil repellency will not be achieved, but when exceeding 20 mass %, non-crystalline portions (amorphous) will increase, and as a result of reduced strength due to softening of the coating film, wear resistance will deteriorate.

The TFE/PEVE copolymer of the present invention may also contain additional copolymerizable comonomers. The amount of such additional comonomers is preferably less than the aforementioned PEVE content and is preferably less than 1 mass % based on the total weights of all monomers in the copolymer. Examples of comonomers that are copolymerizable with TFE include perfluoroalkene with 3 to 6 carbon atoms, PAVE with 1 to 6 carbon atoms other than PEVE, chlorotrifluoroethylene, vinylidene fluoride, vinyl fluoride, functional comonomers containing fluorine described in patent document 2, monomers having a double bond such as ethylene, propylene, butylene, pentene, hexene, styrene, and the like, monomers having a triple bond such as acetylene, propyne, and the like, various acrylic monomers, various dienes and other comonomers not containing fluorine generally used in radical polymerization.

Synthesis of the present TFE/PEVE copolymer can be carried out by conventionally well-known methods. For example, synthesis can be performed by the methods described in patent document 2, patent document 4 and patent document 6.

High durability can also be expected in a coating film when using the method of forming the highly durable PFA disclosed in patent document 4, which is preferred.

The TFE/PEVE copolymer of the present invention is preferably polymerized by dispersion polymerizing in a liquid, and aqueous emulsion polymerization using water as a liquid medium is preferred from the perspective of the environment. In order to provide a copolymer having a uniform composition, a solvent containing fluorine can be used in combination.

Aqueous emulsion polymerization can be performed at a wide range of temperatures, but due to heat transfer problems and use of an initiator that is thermally activated, a high temperature within a range of approximately 50 to 110° C. is advantageous, and a temperature within a range of 70 to 90° C. is preferred. Surfactant used in emulsion polymerization tends to lose dispersion stability when heat is excessive.

An appropriate surfactant can be used in aqueous emulsion polymerization of the present TFE/PEVE copolymer. Specifically, ammonium perfluorooctanoate (C-8), ammonium perfluorononanoate (C-9), a perfluoroalkyl ethane sulfonic acid and salts thereof described in U.S. Pat. No. 4,380,618, and fluoropolyether acid or a salt surfactant described in Japanese PCT Patent Application 2010-509441 are preferably used.

Examples of the initiator for aqueous emulsion polymerization can include water-soluble free radical initiators such as ammonium persulfate (APS), potassium persulfate (KPS), or disuccinic acid peroxide, and redox initiators such as substances using potassium permanganate as a base.

A chain transfer agent (CTA) can be used in aqueous emulsion polymerization of the present TFE/PEVE copolymer. A wide range of compounds can be used as the CTA. For example, a compound containing hydrogen such as molecular hydrogen, a lower alkane, and a lower alkane substituted with a halogen atom can be used. The CTA can result in relatively stable polymer chain end groups due to the structure of the CTA. Preferred examples of the CTA include methane, ethane, and substituted hydrocarbons such as methyl chloride, methylene chloride, chloroform, and carbon tetrachloride. The amount of CTA used in order to achieve a predetermined molecular weight under a specific polymerization condition is dependent on the amount of initiator used and the chain transfer efficiency of the CTA selected. The chain transfer efficiency changes considerably from compound to compound, and also changes based on the temperature.

As disclosed in U.S. Pat. No. 3,635,926, a basic buffering agent such as ammonium carbonate or ammonia (ammonium hydroxide) can be added to provide a more stable amide end group.

Water, a surfactant, CTA (if used), and a comonomer are placed in a reaction vessel and heated to a selected temperature, and then after initiating stirring, an initiator solution is added at a defined rate to initiated polymerization. Pressure reduction is an indicator that polymerization is initiated. Next, TFE addition is initiated, and in order to regulate polymerization, TFE addition (injection) or pressure is controlled. An initiator solution that may be the same or different from the first initiator solution is normally added during the reaction. The PEVE comonomer may be added by placing in a reaction vessel in advance, or by injection adding similarly to TFE after initiating polymerization. The rate of PEVE addition may be uniform or nonuniform (variable).

Furthermore, polymerization can be controlled based on the stirring rate and pressure inside the reaction vessel. High pressure increases the reaction rate, but TFE polymerization is exothermic, and therefore, a high reaction rate increases heat generation, and there is a need to consider heat removal. The pressure that is used is determined based on polymerization vessel design, safety problems around handling TFE, and in general, pressure within a range of approximately 0.3 to 7 MPa is used for aqueous emulsion polymerization of a TFE copolymer, and pressure within a range of 0.7 to 3.5 MPa is more standard. The pressure of the reaction vessel is generally maintained at a constant pressure, but the pressure can also change.

The form of the fluororesin coating composition for forming a topcoat of the present invention is not particularly restricted, but in consideration of the environment, aqueous coating composition or powder coating composition is preferred.

If used as aqueous coating composition (liquid coating composition using water as a primary medium in which a coating composition component such as a TFE/PEVE copolymer or the like is dispersed), an aqueous dispersion of a TFE/PEVE copolymer is preferably used. The aqueous dispersion of the TFE/PEVE copolymer can be used as is as a coating composition, or a filler or various additives used in normal coating composition, such as surfactants (including Leocol manufactured by Lion Corporation, TRITON and TERGITOL Series manufactured by Dow Chemical Company, Emulgen manufactured by Kao Corporation, and other polyoxyethylene alkyl ether and polyoxyethylene alkyl phenyl ether nonionic surfactants, Lipal manufactured by Lion Corporation, Emal and Pelex manufactured by Kao Corporation, and other sulfosuccinates, sodium alkyl ether sulfonate, sulfuric acid mono long chain alkyl anionic surfactants, REOARU manufactured by Lion Corporation, OROTAN manufactured by Dow Chemical Company, and other polycarboxylates, acrylate polymeric surfactants, and the like), film forming agents (including polyamide, polyamide imide, acrylic, acetate, and other polymeric film forming agents, higher alcohols, ethers, polymeric surfactants having a film forming effect, and the like), thickening agents (including water soluble celluloses, solvent dispersing thickening agents, sodium alginate, casein, sodium casein, xanthan gum, polyacrylic acid, acrylic acid ester), and the like, based on the required properties such as dispersibility, conductivity, anti-foaming, enhanced wear resistance, and the like.

Furthermore, a polymerized (raw) dispersion may be used as the TFE/PEVE copolymer aqueous dispersion, but a dispersion concentrated and stabilized by a conventionally known technique such as a method described in U.S. Pat. No. 3,037,953 or the like is preferably used. The concentration of the TFE/PEVE copolymer aqueous dispersion used in coating composition is preferably 20 to 70 mass %, but the concentration of the TFE/PEVE copolymer is preferably increased by condensing to 40 to 70 mass %.

Furthermore, when adjusting the aqueous dispersion, an emulsifier containing fluorine (C-8 or the like) that is used for polymerization can be removed by a conventionally known technique such as a method described in Japanese Patent No. 5185627 (equivalent is US 2006/0148972 A1) or the like, from the perspective of the environment.

If used as powder coating composition, the TFE/PEVE copolymer can be used by separating from a polymerized (raw) dispersion, drying, and then granulating by conventionally known methods, or the TFE/PEVE copolymer aqueous dispersion can be used as spherical particles of the TFE/PEVE copolymer by the method described in Japanese Published Examined Application S52-44576.

Powder and very fine particles of resin can be dispersed in a liquid such as water or the like to use as liquid coating composition such as an aqueous coating composition or the like.

Furthermore, the present fluororesin coating composition can include various organic/inorganic fillers based on required properties. Examples of organic fillers include polyarylene sulfide, polyether ether ketone, polyamide, polyimide, and other engineering plastics. Examples of inorganic fillers include metal powders, metal oxides (aluminum oxide, zinc oxide, tin oxide, titanium oxide, and the like), glass, ceramics, silicon carbide, silicon oxide, calcium fluoride, carbon black, graphite, mica, barium sulfate, and the like. For the shape of the filler, a filler with various shapes such as particulate fillers, fibrous fillers, flaky fillers, or the like can be used.

If the coating composition is a liquid coating composition such as an aqueous coating composition or the like, then the filler is preferably used after dispersing in a liquid medium such as water or the like. If the resin is used as powder, then dry blending by directly mixing a filler with a resin powder, coagulation by adding a filler to an aqueous dispersion and mutually stirring to coagulate, or other method can be used.

In the present invention, the melt flow rate (MFR) of the TFE/PEVE copolymer is preferably 1 g/10 min or higher. When less than 1 g/10 min, the fluidity of the resin will be reduced, and a uniform coating film will be difficult to form when forming a coating film by heating and melting at the melting point or higher. On the other hand, when the MFR is too high, the resin will flow, and a thick coating film will be difficult to form when forming a coating film by heating and melting at the melting point or higher. Therefore, the MFR of TFE/PEVE copolymer is preferably 50 g/10 min or lower, more preferably 40 g/10 min or lower, and even more preferably 30 g/10 min or lower.

In the present invention, the crystalline TFE/PEVE copolymer has a heat of melting ($\Delta Hm$) of 3 J/g or higher. The heat of melting is preferably 5 J/g or higher, and more preferably 8 J/g or higher.

In the present invention, the content of the TFE/PEVE copolymer in the coating composition is such that the TFE/PEVE copolymer content ratio for the total amount of solid content (excluding solvents and the like) remaining in the coating film is preferably 80 mass % or more, and more preferably 90 mass % or more. When the content ratio of the TFE/PEVE copolymer is less than 80 mass %, the TFE/PEVE copolymer on the surface of the coating film will be reduced, and the non-tackiness and water and oil repellency will be reduced.

The substrate to be coated by the present fluororesin coating composition is not particularly restricted, but a substrate that can withstand heat treatment is preferred, and examples include aluminum, iron, stainless steel, and other metal substrates, glass, ceramics, heat resistant plastic substrates, and the like.

The coating film thickness of the top coat coating may be appropriately selected based on use, application portion, or the like, but coating is preferably performed such that the film thickness after a heating and melting treatment is 5 µm or more, and more preferably 10 µm or more. When less than 5 µm, problems will occur where a continuous film will be difficult to form, defects will occur on the coating film, the effect of the coating film (non-tackiness and water and oil repellency) will be more likely to be lost at an early stage due to wear.

The fluororesin coating composition of the present invention can be for a top coat, can be used in an outermost layer of the coating film, and can be applied on a substrate by a conventionally well-known method. Independent application on the substrate is possible, but in order to increase adhesion of the surface layer, a primer coating or surface chemical treatment is preferably used on the substrate. The primer coating composition preferably contains various engineering plastic resins with high adhesion to the substrate (such as polyimide, polyamide, polyamide imide, polyether imide, polyarylene sulfide, polyether ether ketone, and the like), and a fluororesin, and preferably PFA is included in order to improve interlayer adhesion with the topcoat layer. In order to satisfy adhesion between both the substrate and topcoat layer, the ratio of the fluororesin in the primer coating composition is preferably 50 to 90 mass %, and the proportion of the engineering plastic resin and filler is preferably 10 to 50 mass %.

In the present invention, the coating film is preferably formed by heat treating after coating, and more preferably formed by heat treating at the melting point or higher of the TFE/PEVE copolymer included in the coating composition. The TFE/PEVE copolymer is melt flowed to obtain a uniform coating film, and a TFE/PEVE copolymer with low surface energy is moved and exposed on the coating film surface to improve the non-tackiness and water and oil repellency.

In the present invention, in order to achieve high non-tackiness and water and oil repellency, the contact angle of n-hexane is preferably 27 degrees or more, more preferably 28 degrees or more, even more preferably 29 degrees or more, and most preferably 30 degrees or more, for example.

In the present invention, in order to achieve high non-tackiness and water and oil repellency, the sliding angle of pure water is preferably 50 degrees or less, more preferably 45 degrees or less, and even more preferably 40 degrees or less.

Examples of articles having the coating film of the present invention include articles in which non-tackiness and water and oil repellency are required, such as frying pans, rice cookers, and other cookware, fuser rollers, belts, inkjet nozzles, and other office automation equipment related articles, piping and other chemical plant industrial facility related articles, and the like.

In the present invention, the physical properties of the fluororesin were measured by the following methods.

(1) Comonomer Content: The comonomer content was determined in accordance with a method described in patent document 6, from the infrared absorption spectrum (nitrogen atmosphere) of a film with a thickness of approximately 50 micrometers obtained by compressing a sample at 350° C. and then water cooling.

(2) Melt Flow Rate (MFR): Using a melt indexer (manufactured by Toyo Seiki) with a corrosion resistant cylinder, die, and piston in accordance with ASTM D-1238-95, 5 g of sample powder was filled into a cylinder at 372±1° C. and maintained for five minutes, and then extruded through a die orifice under a load of 5 kg (piston and weight), and the extruding rate (g/10 min) at this time was determined as the MFR.

(3) Differential Scanning calorimetry (Heat of Melting: $\Delta Hm$): A differential scanning calorimeter (Pyris 1 DSC manufactured by Perkin Elmer Co., Ltd.) was used. A 10 mg sample was weighed and placed in a dedicated aluminum pan, crimped by a dedicated crimper, stored in the DSC body, and then the temperature was increased from 150° C. to 360° C. at a rate of 10° C./min. After maintaining the sample at 360° C. for 1 minute, the temperature was reduced to 150° C. at a rate of 10° C./min, and then after maintaining the sample at 150° C. for 1 min, the temperature was again increased to 360° C. at a rate of 10° C./min. In a melting curve obtained at this time, the heat of melting ($\Delta Hm$) was determined based on the peak area determined by connecting by a straight line the point where the curve separates from the baseline and the point where the curve returns to the baseline before and after the melting peak.

EXAMPLES

The present invention is described below in more detail based on examples and comparative examples, but is not restricted to these examples. Note that performance evaluations were performed as described below.

A. Method of Preparing Coating Film

A coating film used in the performance evaluation was prepared by the following procedure.

(1) Substrate Surface Treatment (Coating Film Cleaning)

A surface of a substrate aluminum (JIS A1050 conforming product: 50 mm×100 mm, thickness: 1 mm) was washed with water using a cleaning agent for dishes, and then degreased using isopropyl alcohol.

(2) Undercoating (Primer Coating)

Liquid coating composition PJ-BK832 (manufactured by Du Pont-Mitsui Fluorochemicals Co., Ltd.) was sprayed at an air pressure of 2.5 to 3.0 kgf/cm3 onto a substrate treated by the aforementioned (1) using an air spray coating gun (W-88-10E2φ1 mm nozzle (manual gun) manufactured by Anest Iwata Corporation) to perform coating. Coating is performed such that the coated liquid mass is approximately 0.2 g (0.15 to 0.25 g) per one sheet of substrate, drying is performed for 15 minutes at 120° C. in a forced air circulating furnace, and then drying is performed for 15 minutes at 200° C. to form a coating film with a thickness of 6 to 8 μm. For the coating condition, the temperature was 25° C., and the humidity was 60% RH.

(3) Coating Film Formation by Dip Coating

Coating of the liquid top coat was performed at a lifting rate of 0.1 to 3 mm/s using a dip coating machine (tabletop dip coater DT-0502-PC manufactured by SDI Company, Ltd.) on an aluminum substrate treated by the aforementioned (1) and (2). The lifting rate was adjusted in order to achieve a uniform film thickness between samples described below. After drying for 15 minutes at 120° C. in the forced air circulating furnace, baking was performed for 20 minutes at 380° C., and then cooling was performed at room temperature to form a coating film with a thickness of 5 to 10 μm. For the coating condition, the temperature was 25° C., and the humidity was 60% RH.

(3)' Coating Film Formation by Electrostatic Coating

A powder was electrostatic spray coated onto a grounded aluminum substrate at a distance of 25 cm, at a coating voltage of 20 to 40 kV (negative) and discharge rate of approximately 50 g/min, using an electrostatic powder coating machine (Hand Gun System GX7500CS manufactured by Nihon Parkerizing Co., Ltd.) on an aluminum substrate treated according to (1) and (2). The powder mass per one sheet of substrate was set to 0.4 to 0.5 g, baking was performed for 20 minutes at 380° C. in a forced air circulating furnace, and then cooling was performed at room temperature to form a coating film with a thickness of 40 to 50 μm. For the coating condition, the temperature was 25° C., and the humidity was 60% RH.

B. Performance Evaluation of Coating Film

The non-tackiness and water and oil repellency of the coating film were evaluated as described below.

(1) Contact Angle

The contact angle (droplet size: approximately 4 μL) of n-hexane was measured using a full automatic contact angle meter (DM-701 manufactured by Kyowa Interface Science Co., Ltd.) at a measurement environment of 25° C. and humidity of 60% RH.

(2) Sliding Angle

The sliding angle of pure water was measured using a fully automatic contact angle meter (DM-701 manufactured by Kyowa Interface Science Co., Ltd.). The coating film or extruded sheet was inclined in 1 degree increments, and the angle directly before the droplets (droplet size: 10 μL) slide down was set as the sliding angle.

Example 1

After stabilizing by adding a non-ionic surfactant (Leocol TDN 90-80 manufactured by Lion Corporation) to a TFE/PEVE copolymer aqueous dispersion where the resin solid content (resin weight/aqueous dispersion weight) obtained in accordance with the method described in example 1 of patent document 4 is approximately 26 mass %, a fluorine emulsifier used in polymerization was removed by a method described in Japanese Patent No 5185627 (equivalent US 2006/0148972 A1) to obtain an aqueous dispersion of a TFE/PEVE copolymer where the resin solid content in the dispersion was adjusted to approximately 60 mass % by condensing.

Example 2

Condensation was performed similarly to example 1 on the aqueous dispersion obtained in accordance with the method described in comparative example 1 of Japanese Unexamined Patent Application 2004-161921 or patent document 4 to obtain an aqueous dispersion of a TFE/PEVE copolymer adjusted to approximately 60 mass %.

Example 3

An acrylic film forming agent, thickening agent, and surfactant were added to the aqueous dispersion of a TFE/PEVE copolymer obtained in example 1 to prepare an adjusted coating composition. Note that the coating film component after baking at 380° contains 100% fluororesin in the total solid content (acrylic and the like are volatilized by decomposition).

Example 4

Spherical particles were prepared by a method described in Japanese Published Examined Application S52-44576 using the aqueous dispersion of a TFE/PEVE copolymer obtained in example 1, which was used as powder coating composition.

Comparative Example 1

Condensation was performed similarly to example 1 on the aqueous dispersion obtained in accordance with a method described in comparative example 1 of Japanese Unexamined Patent Application 2004-161921 or patent document 4 to obtain an aqueous dispersion of a TFE/PEVE copolymer adjusted to approximately 60 mass %.

Comparative Example 2

An aqueous dispersion of a TFE/PEVE copolymer was obtained by a method similar to comparative example 1. The content of comonomer (PEVE) was equal to the TFE/PEVE copolymer of comparative example 1, but the molecular weight was higher, and therefore a resin with a reduced MFR was obtained.

Comparative Example 3

An aqueous dispersion of a TFE/PEVE copolymer was obtained by a method similar to comparative example 1.

Comparative Example 4

Aqueous dispersion PFA334-JR of a TFE/PPVE copolymer manufactured by Du Pont-Mitsui Fluorochemicals Co., Ltd. was used.

Comparative Example 5

Aqueous dispersion PFA335-JR of a TFE/PPVE copolymer manufactured by Du Pont-Mitsui Fluorochemicals Co., Ltd. was used.

Comparative Example 6

Aqueous dispersion FEP120-JR of a TFE/HFP copolymer manufactured by Du Pont-Mitsui Fluorochemicals Co., Ltd. was used.

Comparative Example 7

A PTFE aqueous dispersion PTFE34-JR manufactured by Du Pont-Mitsui Fluorochemicals Co., Ltd. was used.

Comparative Example 8

Topcoat fluororesin coating composition EJ-CL565 manufactured by Du Pont-Mitsui Fluorochemicals Co., Ltd. was used.

Comparative Example 9

An acrylic film forming agent, thickening agent, and surfactant were added to aqueous dispersion PFA335-JR of a TFE/PPVE copolymer manufactured by Du Pont-Mitsui Fluorochemicals Co., Ltd. to prepare an adjusted coating composition. Note that the coating film component after baking at 380° contains 100% fluororesin in the total solid content (acrylic and the like are volatilized by decomposition).

Comparative Example 10

Pellets PFA959-HP Plus of a TFE/PEVE copolymer manufactured by Du Pont-Mitsui Fluorochemicals Co., Ltd. was used to prepare a sheet with a 150 mm width and 0.2 mm thickness at a molding temperature of 360° C. using a φ25 mm film extrusion molding machine manufactured by Plagiken Co., Ltd.

Comparative Example 11

Pellets PFA350-J of a TFE/PPVE copolymer manufactured by Du Pont-Mitsui Fluorochemicals Co., Ltd. were used to prepared a sheet with a 150 mm width and 0.2 mm thickness at a molding temperature of 360° C. using a φ25 mm film extrusion molding machine manufactured by Plagiken Co., Ltd.

The results of the performance evaluation of the coating film and physical properties of examples 1 through 4 and comparative examples 1 through 11 are shown in Table 1.

The present fluororesin coating compositions for a topcoat containing a TFE/PEVE copolymer was found to have a higher contact angle for n-hexane and a lower sliding angle of pure water as compared to the comparative examples, and to have excellent non-tackiness and water and oil repellency as compared to sheet films (comparative example 10 and comparative example 11) and fluororesin coating compositions for a topcoat used thus far.

TABLE 1

|  | Fluororesin Data (used in the coating composition) | | | | Coating Film Evaluation Results | |
| --- | --- | --- | --- | --- | --- | --- |
|  | Type | Comonomer | Comonomer Content (mass %) | MFR [g/10 min] | Heat of Melting ΔHm [J/g] | n-Hexane Contact Angle [deg] | Pure Water Sliding Angle [deg] |
| Example 1 | PFA | PEVE | 10.0 | 2.20 | 9.1 | 32.1 | 28.1 |
| Example 2 | PFA | PEVE | 11.4 | 28.70 | 18.0 | 31.3 | 40.9 |
| Example 3 | PFA | PEVE | 10.0 | 2.20 | 9.1 | 33.2 | 27.0 |
| Adjusted Coating composition (Liquid) | | | | | | | |
| Example 4 | PFA | PEVE | 10.0 | 2.20 | 9.1 | 35.0 | 37.0 |
| Powder Coating composition | | | | | | | |
| Comparative Example 1 | PFA | PEVE | 6.8 | 7.41 | 11.3 | 25.5 | 45.8 |
| Comparative Example 2 | PFA | PEVE | 6.8 | 2.14 | 18.1 | 24.0 | 49.0 |
| Comparative Example 3 | PFA | PEVE | 24.0 | High Fluidity, Measurement Not Possible | 1.8 | 39.1 | 65.4 |
| Comparative Example 4 | PFA | PPVE | 3.8 | 14.80 | 32.7 | 19.9 | 56.4 |
| Comparative Example 5 | PFA | PPVE | 3.8 | 1.95 | 24.8 | 19.7 | 50.4 |
| Comparative Example 6 | FEP | HFP | 12.5 | 6.63 | 14.5 | 21.0 | 42.0 |
| Comparative Example 7 | PTFE | None | — | No Flow | 48.9 | 12.0 | Over 70 |
| Comparative Example 8 | PFA | PEVE | 6.8 | 7.41 | 11.3 | 26.3 | 41.6 |
| Adjusted Coating composition (Liquid) | | | | | | | |
| Comparative Example 9 | PFA | PPVE | 3.8 | 1.95 | 24.8 | 20.3 | 63.3 |
| Adjusted Coating composition (Liquid) | | | | | | | |
| Comparative Example 10 | PFA | PEVE | 10.0 | 2.20 | 9.1 | — | Over 70 |
| Extruded Sheet | | | | | | | |
| Comparative Example 11 | PFA | PPVE | 3.8 | 1.95 | 24.8 | — | Over 70 |
| Extruded Sheet | | | | | | | |

What is claimed is:

1. A fluororesin coating composition for forming a topcoat, the fluororesin coating composition consisting essentially of a crystalline copolymer consisting of tetrafluoroethylene and perfluoro(ethyl vinyl ether) having a perfluoro (ethyl vinyl ether) content of 8 to 20 mass% based on the total mass of said crystalline copolymer.

2. The coating composition of claim 1, which is an aqueous coating composition or a powder coating composition.

3. A coating film on a substrate formed from the coating composition of claim 1.

4. The coating film of claim 3, wherein said substrate is primer coated or the surface of said substrate is chemically treated prior to being coated with said coating film.

5. The coating film of claim 3, which is heat treated at the melting point or higher of said crystalline copolymer.

6. The coating film of claim 3, wherein the contact angle of n-hexane on said coating film at 25° C. and 60% relative humidity is 27 degrees or more.

7. An article, comprising the coating composition according to claim 1 coated on a substrate.

8. A method of forming a coating film on a substrate, comprising the steps of:
coating the coating composition of claim 1 on a substrate; and then performing heat treatment on the coated substrate.

9. The method according to claim 8, wherein said heat treatment is carried out at the melting point or higher of said crystalline copolymer.

10. The coating composition of claim 1, wherein the perfluoro(ethyl vinyl ether) content is 8 to 15 mass% based on the total mass of said polymer.

11. The coating composition of claim 10, wherein the perfluoro(ethyl vinyl ether) content is 9 to 12 mass% based on the total mass of said polymer.

12. The coating composition of claim 1, wherein the mass of said crystalline copolymer forms at least 80 mass% of a solid content of the fluororesin coating composition.

13. The coating composition of claim 12, wherein the mass of said crystalline copolymer forms at least 90 mass% of the solid content of the fluororesin coating composition.

14. The coating composition of claim 1 further comprising at least one additive selected from the group consisting of a surfactant, a film-forming agent, a thickening agent, and a combination thereof.

15. The coating composition of claim 14, wherein the coating composition is an aqueous dispersion further comprising water.

16. The coating composition of claim 1, wherein the coating composition is a powder coating composition.

\* \* \* \* \*